US012536828B2

(12) United States Patent
Araki et al.

(10) Patent No.: US 12,536,828 B2
(45) Date of Patent: Jan. 27, 2026

(54) DETECTION DEVICE INCLUDING LIGHT GUIDE PLATE

(71) Applicant: Magnolia White Corporation, Tokyo (JP)

(72) Inventors: Shigesumi Araki, Tokyo (JP); Kazuki Matsunaga, Tokyo (JP); Akio Takimoto, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/659,195

(22) Filed: May 9, 2024

(65) Prior Publication Data

US 2024/0290130 A1    Aug. 29, 2024

Related U.S. Application Data

(63) Continuation of application No. PCT/JP2022/042132, filed on Nov. 11, 2022.

(30) Foreign Application Priority Data

Nov. 12, 2021    (JP) ................... 2021-185215

(51) Int. Cl.
G06V 40/13        (2022.01)
G06V 40/145       (2022.01)
(Continued)

(52) U.S. Cl.
CPC .......... *G06V 40/13* (2022.01); *G06V 40/1318* (2022.01); *G06V 40/145* (2022.01);
(Continued)

(58) Field of Classification Search
CPC .. G06V 40/145; G06V 40/13; G06V 2201/03; G06V 40/10; G06V 40/1318;
(Continued)

(56) References Cited

U.S. PATENT DOCUMENTS 6,011,860 A     1/2000  Fujieda et al.
9,753,213 B2 *  9/2017  Nishitani ............. G02B 6/0031
(Continued)

FOREIGN PATENT DOCUMENTS

JP    10-289304 A    10/1998
JP    H11-120324 A    4/1999
(Continued)

OTHER PUBLICATIONS

Search Report issued in related International Patent Application No. PCT/JP2022/042132 mailed on Dec. 13, 2022 and English translation of same. 5 pages.

(Continued)

*Primary Examiner* — Georgia Y Epps
*Assistant Examiner* — Erin R Garber
(74) *Attorney, Agent, or Firm* — K&L Gates LLP

(57) ABSTRACT

According to an aspect, a detection device includes: photodiodes arranged on a substrate; and a front light comprising a light guide plate disposed so as to overlap the photodiodes, a first light source configured to emit first light to a first side surface of the light guide plate, a second light source configured to emit second light having the same wavelength as that of the first light to a second side surface of the light guide plate opposite to the first side surface, a third light source configured to emit third light having a wavelength different from that of the first light to a third side surface of the light guide plate different from the first and second side surfaces, and scattering portions provided on the light guide plate and configured to scatter light from any of the first light source, the second light source, and the third light source.

4 Claims, 14 Drawing Sheets

(51) Int. Cl.
   *H10F 55/00*   (2025.01)
   *G06V 40/10*   (2022.01)
   *H10F 39/12*   (2025.01)
(52) U.S. Cl.
   CPC .............. *H10F 55/00* (2025.01); *G06V 40/10* (2022.01); *G06V 2201/03* (2022.01); *H10F 39/12* (2025.01)
(58) Field of Classification Search
   CPC ....... H01L 27/146; H01L 31/10; H01L 31/12; G02F 1/133615
   See application file for complete search history.

(56) References Cited

U.S. PATENT DOCUMENTS

| | | | |
|---|---|---|---|
| 2012/0085890 A1 | 4/2012 | Kurokawa | |
| 2012/0163019 A1* | 6/2012 | Sekiguchi | G02B 6/0058 362/602 |
| 2012/0328170 A1* | 12/2012 | Wu | G06V 40/1324 382/124 |
| 2014/0313772 A1* | 10/2014 | Kamada | G02B 6/0061 362/611 |
| 2018/0364408 A1* | 12/2018 | Hwang | G02F 1/133603 |
| 2019/0125221 A1* | 5/2019 | Kobayashi | G06T 1/0007 |
| 2020/0132914 A1* | 4/2020 | Song | G02B 6/0051 |
| 2021/0280569 A1* | 9/2021 | You | G06V 40/1318 |
| 2022/0039697 A1* | 2/2022 | Higano | G02B 6/005 |

FOREIGN PATENT DOCUMENTS

| | | | | |
|---|---|---|---|---|
| JP | 2019-045503 A | | 3/2019 | |
| JP | 2020-184227 A | | 11/2020 | |
| TW | 200823560 A | * | 6/2008 | ............ G02F 1/1335 |
| WO | WO-2010057553 A1 | * | 5/2010 | ............ G02B 5/0247 |

OTHER PUBLICATIONS

Written Opinion issued in related International Patent Application No. PCT/JP2022/042132 mailed on Dec. 13, 2022. 4 pages.

Office Action issued in related Japanese Patent Application No. 2023-559932 on Nov. 26, 2024 and English translation of same. 5 pages.

\* cited by examiner

DETECTION DEVICE INCLUDING LIGHT GUIDE PLATE

CROSS-REFERENCE TO RELATED APPLICATION

This application claims the benefit of priority from Japanese Patent Application No. 2021-185215 filed on Nov. 12, 2021 and International Patent Application No. PCT/JP2022/042132 filed on Nov. 11, 2022, the entire contents of which are incorporated herein by reference.

BACKGROUND

1. Technical Field

What is disclosed herein relates to a detection device.

2. Description of the Related Art

Optical sensors capable of detecting fingerprint patterns, vein patterns, or the like are known (for example, Japanese Patent Application Laid-open Publication No. 2019-045503 (JP-A-2019-045503) and Japanese Patent Application Laid-open Publication No. H11-120324 (JP-A-H11-120324)). The optical sensors described in JP-A-2019-045503 and JP-A-H11-120324 are each provided with a front light on the front side of a plurality of photodiodes.

Insufficient illumination of light emitted from the front light may reduce contrast for detection.

For the foregoing reasons, there is a need for a detection device that includes a front light and is capable of achieving good detection accuracy.

SUMMARY

According to an aspect, a detection device includes: a plurality of photodiodes arranged on a substrate; and a front light comprising a light guide plate disposed so as to overlap the photodiodes, a first light source configured to emit first light to a first side surface of the light guide plate, a second light source configured to emit second light having the same wavelength as that of the first light to a second side surface of the light guide plate opposite to the first side surface, a third light source configured to emit third light having a wavelength different from that of the first light to a third side surface of the light guide plate different from the first side surface and the second side surface, and a plurality of scattering portions that are provided on the light guide plate and configured to scatter light from any of the first light source, the second light source, and the third light source.

According to an aspect, the detection device preferably includes the optical filter layer including a plurality of light guide paths that at least partially overlap the photodiodes, and a light-blocking portion having higher absorptance of the light than the light guide paths.

DETAILED DESCRIPTION

Figure 1:
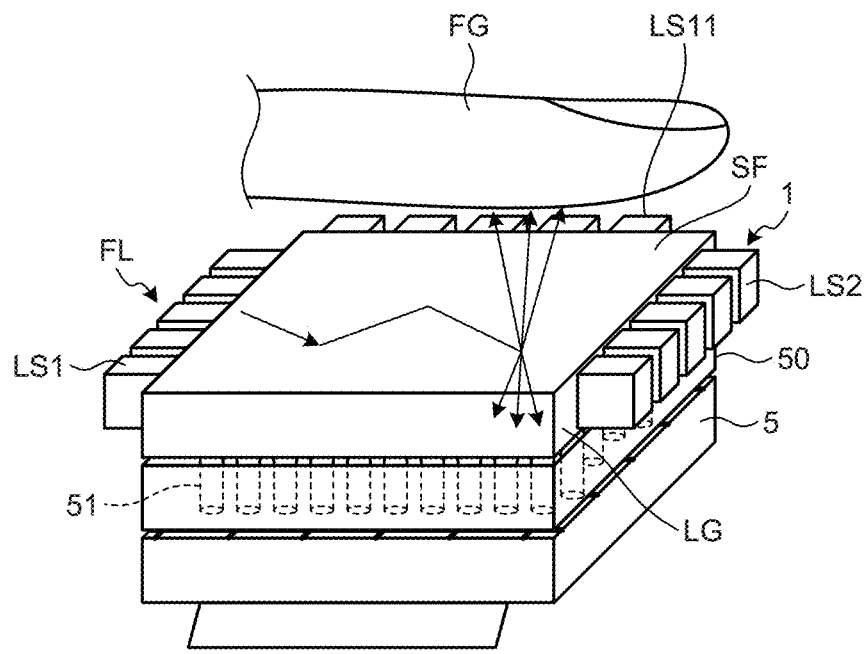
FIG. 1 is a perspective view schematically illustrating a detection device according to a first embodiment of the present disclosure.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

First Embodiment

Figure 2:
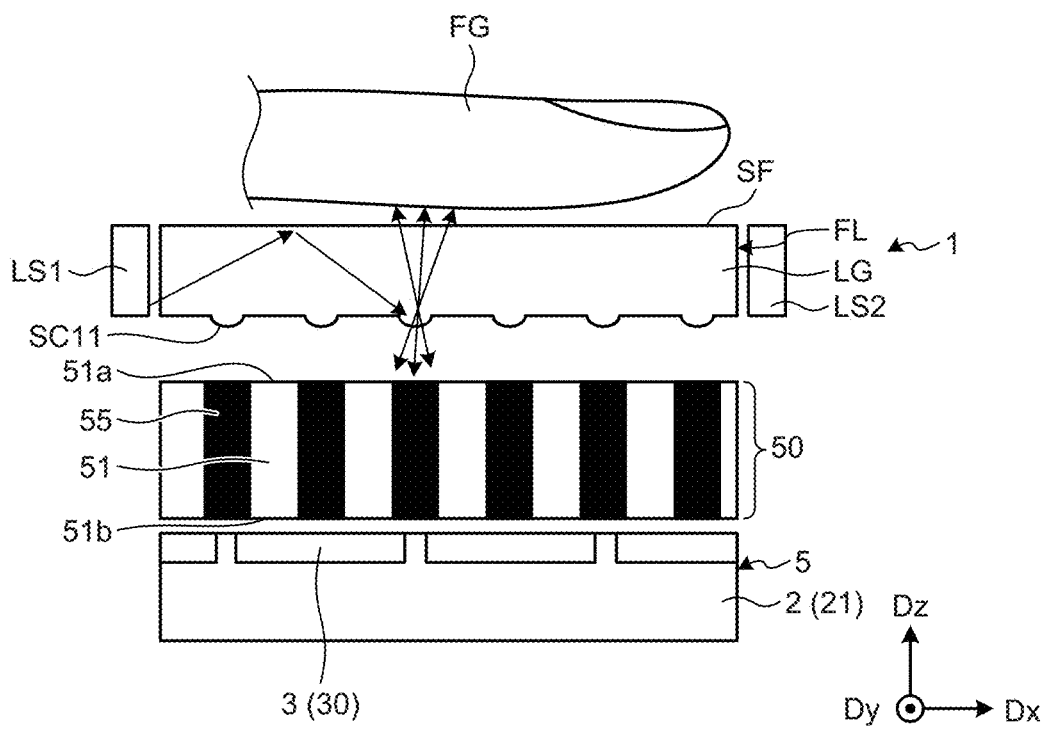
FIG. 2 is a sectional view illustrating a schematic sectional configuration of the detection device according to the first embodiment.

FIG. 1 is a perspective view schematically illustrating a detection device according to a first embodiment of the present disclosure. FIG. 2 is a sectional view illustrating a schematic sectional configuration of the detection device according to the first embodiment. As illustrated in FIGS. 1 and 2, a detection device 1 includes an optical sensor 5, an optical filter layer 50, and a front light FL. The optical filter layer 50 and the front light FL are stacked in this order on the optical sensor 5

The optical sensor 5 includes an array substrate 2, a plurality of detection elements 3 (photodiodes 30) formed on the array substrate 2. The array substrate 2 is formed using a substrate 21 as a base. Each of the detection elements 3 is configured with a corresponding one of the photodiodes 30, a plurality of transistors, and various types of wiring. The array substrate 2 with the photodiodes 30 formed thereon is a drive circuit board for driving the sensor on a predetermined detection area basis and is also called a backplane or an active matrix substrate.

The optical filter layer 50 is arranged so as to face the photodiodes 30 and arranged between the photodiodes 30 and a group of a light guide plate LG of the front light FL and an object to be detected FG such as a finger. The optical filter layer 50 includes a plurality of light guide paths 51 and a light-blocking portion 55 provided around the light guide paths 51. The light guide paths 51 at least partially overlap the photodiodes 30. The light-blocking portion 55 has higher absorptance of the light than the light guide paths 51. The optical filter layer 50 is an optical element that transmits components of light reflected by the object to be detected FG such as the finger that travel in a third direction Dz toward the photodiodes 30. The optical filter layer 50 is also called collimating apertures or a collimator.

In the following description, a first direction Dx is one direction in a plane parallel to the substrate 21. A second direction Dy is one direction in the plane parallel to the substrate 21 and is a direction orthogonal to the first direction Dx. The second direction Dy may non-orthogonally intersect the first direction Dx. The third direction Dz is a direction orthogonal to the first direction Dx and the second direction Dy and is a direction normal to a principle surface of the substrate 21. The term "plan view" refers to a positional relation when viewed in a direction orthogonal to the substrate 21.

The front light FL is arranged above the optical filter layer 50, that is, on the front side of the optical sensor 5 and the optical filter layer 50. The front light FL includes the light guide plate LG having light-transmitting properties, first, second, and third light sources LS1, LS2, and LS11 that face side surfaces of the light guide plate LG, and a plurality of scattering portions SC11. The optical filter layer 50 and the front light FL are bonded together with an optical resin therebetween, which is not illustrated. A space (air layer) may be provided between the optical filter layer 50 and the front light FL.

A plurality of the first light sources LS1 are provided facing a first side surface of the light guide plate LG, and a plurality of the second light sources LS2 are provided facing a second side surface opposite to the first side surface of the light guide plate LG. A plurality of the light sources LS11 are provided facing a third side surface different from the first and the second side surfaces of the light guide plate LG. The first and the second light sources LS1 and LS2 are, for example, light-emitting diodes (LEDs) that emit red light. The first and the second light sources LS1 and LS2 are not limited to this color and can be changed to, for example, green as appropriate depending on measurement items. The LEDs of the first light sources LS1 are arranged along the first side surface of the light guide plate LG. The LEDs of the second light sources LS2 are arranged along the second side surface of the light guide plate LG. The third light sources LS11 are, for example, light-emitting diodes (LEDs) that emit infrared light.

The first light sources LS1 emit first light having a wavelength of 600 nm or larger and smaller than 800 nm. The second light sources LS2 emit second light having a wavelength of 600 nm or larger and smaller than 800 nm, which is the same wavelength as that of the first light. The light having a wavelength of 600 nm or larger and smaller than 800 nm is red visible light and is hereinafter referred to as "red light". The third light sources LS11 emit third light having a wavelength of 800 nm or larger and smaller than 1000 nm. The light having a wavelength of 800 nm or larger and smaller than 1000 nm is infrared light.

The object to be detected FG is arranged so as to face a detection surface SF of the light guide plate LG. The scattering portions SC11 are provided on a surface opposite to the detection surface SF of the light guide plate LG, that is, a surface of the light guide plate LG facing the optical filter layer 50. Moreover, the scattering portions SC11 are provided in an area overlapping the light-blocking portion 55 of the optical filter layer 50. The scattering portions SC11 are dot-shaped projecting or recessed portions. The scattering portions SC11 may be grooves.

The red light emitted from the first and the second light sources LS1 and LS2 propagates in the light guide plate LG while being repeatedly totally reflected on the detection surface SF and the back surface. In the same manner, the infrared light emitted from the third light sources LS11 propagates in the light guide plate LG while being repeatedly totally reflected on the detection surface SF and the back surface. Part of the light propagating in the light guide plate LG is scattered by the scattering portions SC11. Part of the light scattered by the scattering portions SC11 is emitted from the detection surface SF of the light guide plate LG to the object to be detected FG. Part of the light reflected by the object to be detected FG is applied to the photodiodes 30 through the light guide plate LG and the light guide paths 51 of the optical filter layer 50. As a result, the photodiodes 30 of the optical sensor 5 can detect information on the object to be detected FG using the light emitted from the first, the second, and the third light sources LS1, LS2, and LS11.

The light scattered by the scattering portions SC11 includes components emitted to the optical filter layer 50 facing the light guide plate LG, in addition to the components emitted toward the object to be detected FG. Since the scattering portions SC11 are provided in the area overlapping the light-blocking portion 55 of the optical filter layer 50, the light scattered toward the optical filter layer 50 by the scattering portions SC11 is blocked by the light-blocking portion 55 without entering the light guide paths 51.

As a result, in the detection device 1, the photodiodes 30 of the optical sensor 5 are mainly irradiated with the light reflected by the object to be detected FG, and part of the light from the front light FL that travels toward the opposite side to the object to be detected FG and directly enter the photodiodes 30 is reduced. Therefore, the detection device 1 including the front light FL can be improved detection accuracy.

The object to be detected FG is, for example, the finger, a palm, or a wrist. For example, the optical sensor 5 can detect information on, for example, a fingerprint of the object to be detected FG based on the light. The optical sensor 5 may also detect various types of information (biometric information) such as shapes of blood vessels, pulsation, and pulse waves. That is, the detection device 1 may be configured as a fingerprint detection device to detect the fingerprint or a vein detection device to detect a vascular pattern of, for example, veins.

Figure 3:
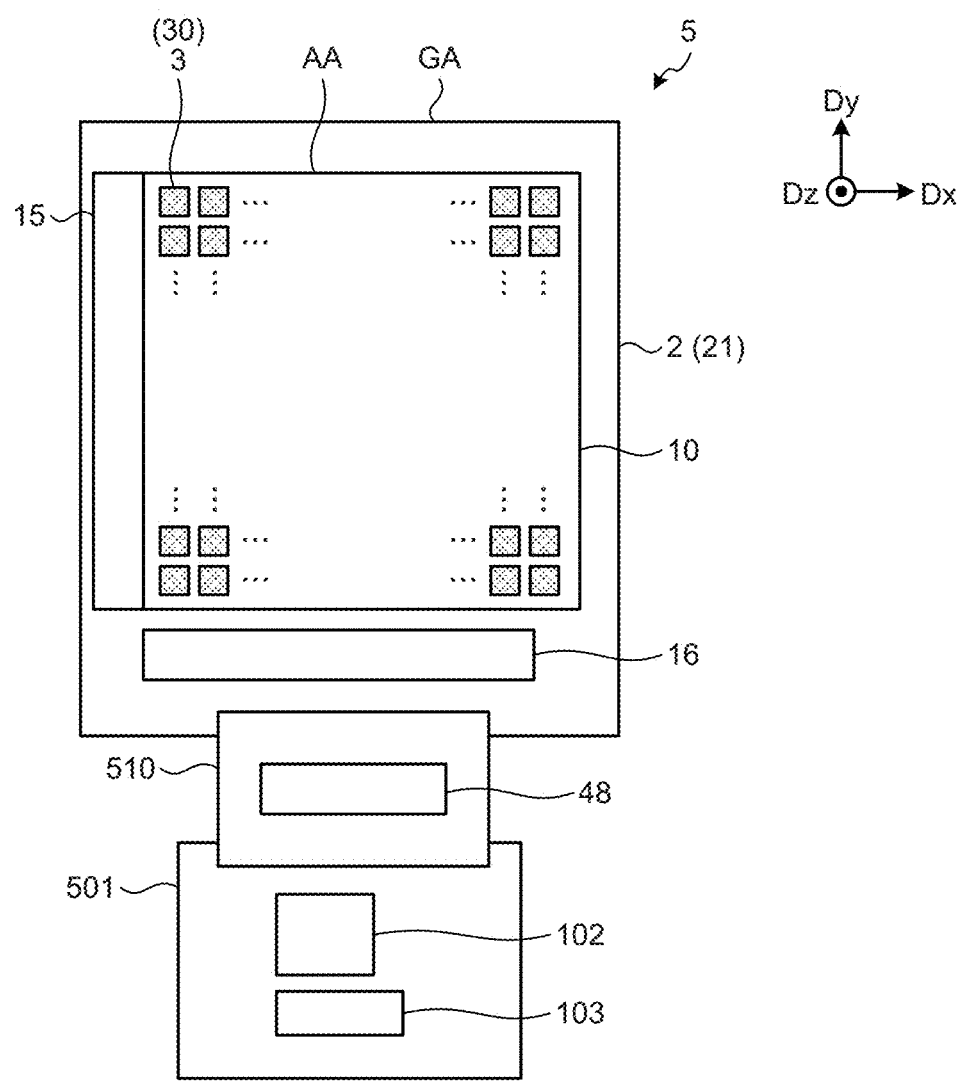
FIG. 3 is a plan view illustrating the detection device according to the first embodiment.

FIG. 3 is a plan view illustrating the detection device according to the first embodiment. As illustrated in FIG. 3, the optical sensor 5 included in the detection device 1 includes the substrate 21 (array substrate 2), a sensor 10, a scan line drive circuit 15, a signal line selection circuit 16, a detection circuit 48, a control circuit 102, and a power supply circuit 103.

The substrate 21 is electrically coupled to a control substrate 501 through a wiring substrate 510. The wiring substrate 510 is, for example, a flexible printed circuit board or a rigid circuit board. The wiring substrate 510 is provided with the detection circuit 48. The control substrate 501 is provided with the control circuit 102 and the power supply circuit 103. The control circuit 102 is, for example, a field-programmable gate array (FPGA). The control circuit 102 supplies control signals to the sensor 10, the scan line drive circuit 15, and the signal line selection circuit 16 to control detection operations of the sensor 10. The control circuit 102 also supplies control signals to the front light FL (refer to FIGS. 1 and 2) to control lighting and non-lighting of the first, the second, and the third light sources LS1, LS2, and LS11. The power supply circuit 103 supplies voltage signals including, for example, a power supply potential SVS and a reference potential VR1 (refer to FIG. 5) to the sensor 10, the scan line drive circuit 15, and the signal line selection circuit 16.

The substrate 21 has a detection area AA and a peripheral area GA. The detection area AA is an area provided with the photodiodes 30 included in the sensor 10. The peripheral area GA is an area between the outer perimeter of the detection area AA and the ends of the substrate 21, and is an area not provided with the photodiodes 30.

The scan line drive circuit 15 and the signal line selection circuit 16 are provided in the peripheral area GA. Specifically, the scan line drive circuit 15 is provided in an area extending along the second direction Dy in the peripheral area GA. The signal line selection circuit 16 is provided in an area extending along the first direction Dx in the peripheral area GA and is provided between the sensor 10 and the detection circuit 48.

Each of the detection elements 3 of the sensor 10 is an optical sensor including the photodiode 30 as a sensor element. Each of the photodiodes 30 is a photoelectric conversion element and outputs an electrical signal corresponding to light emitted thereto. More specifically, the photodiode 30 is a positive-intrinsic-negative (PIN) photodiode or an organic photodiode (OPD) using an organic semiconductor. The detection elements 3 (photodiodes 30) are arranged in a matrix having a row-column configuration in the detection area AA.

The photodiode 30 included in each of the detection elements 3 performs the detection in accordance with gate drive signals supplied from the scan line drive circuit 15. Each of the photodiodes 30 outputs the electrical signal corresponding to the light irradiating the photodiode 30 as a detection signal Vdet to the signal line selection circuit 16. The detection device 1 detects the information on the object to be detected FG based on the detection signals Vdet from the photodiodes 30.

Figure 4:
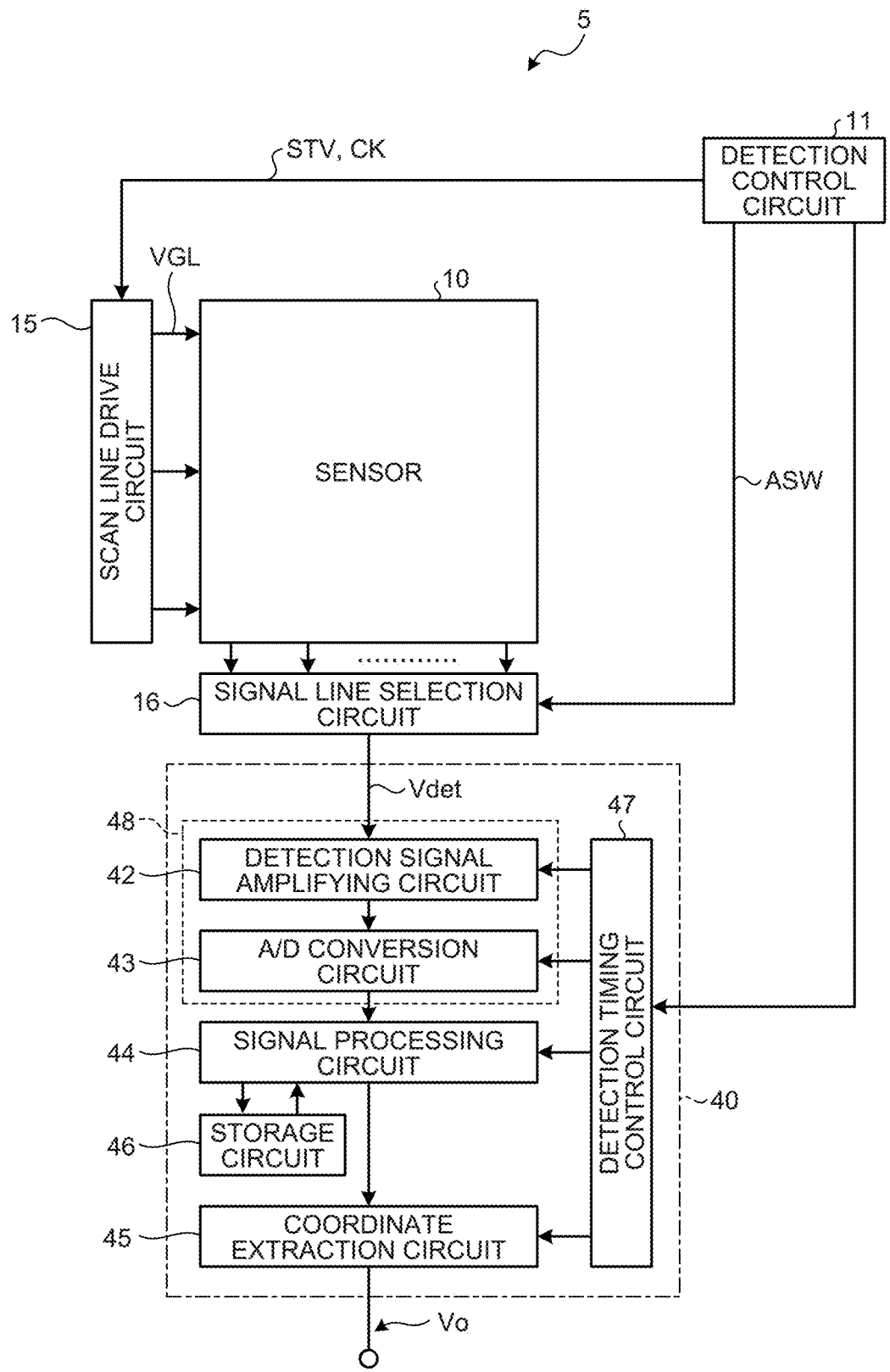
FIG. 4 is a block diagram illustrating a configuration example of the detection device according to the first embodiment.

FIG. 4 is a block diagram illustrating a configuration example of the detection device according to the first embodiment. As illustrated in FIG. 4, the detection device 1 further includes a detection control circuit 11 and a detector (detection processing circuit) 40. The control circuit 102 includes one, some, or all functions of the detection control circuit 11. The control circuit 102 also includes one, some, or all functions of the detector 40 other than those of the detection circuit 48.

The detection control circuit 11 is a circuit that supplies respective control signals to the scan line drive circuit 15, the signal line selection circuit 16, and the detector 40 to control operations of these components. The detection control circuit 11 supplies various control signals including, for example, a start signal STV, a clock signal CK, and a reset signal RST1 to the scan line drive circuit 15. The detection control circuit 11 also supplies various control signals including, for example, a selection signal ASW to the signal line selection circuit 16.

The scan line drive circuit 15 is a circuit that drives a plurality of scan lines GLS (refer to FIG. 5) based on the various control signals. The scan line drive circuit 15 sequentially or simultaneously selects the scan lines GLS, and supplies gate drive signals VGL to the selected scan lines GLS. Through this operation, the scan line drive circuit 15 selects the photodiodes 30 coupled to the scan lines GLS.

Figure 5:
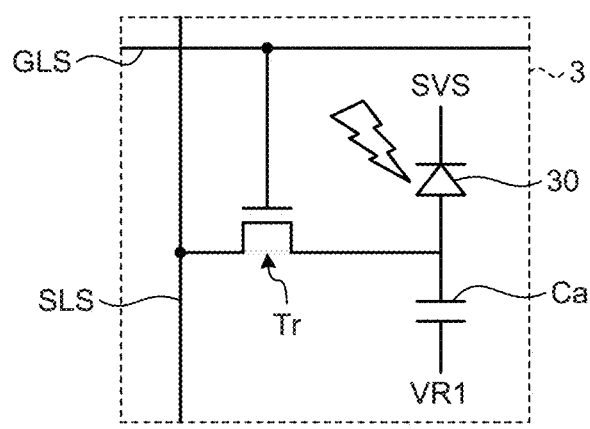
FIG. 5 is a circuit diagram of a detection element.

The signal line selection circuit 16 is a switch circuit that sequentially or simultaneously selects a plurality of output signal lines SLS (refer to FIG. 5). The signal line selection circuit 16 is, for example, a multiplexer. The signal line selection circuit 16 couples the selected output signal lines SLS to the detection circuit 48 based on the selection signal ASW supplied from the detection control circuit 11. Through this operation, the signal line selection circuit 16 outputs the detection signals Vdet of the photodiodes 30 to the detector 40.

The detector 40 includes the detection circuit 48, a signal processing circuit 44, a coordinate extraction circuit 45, a storage circuit 46, and a detection timing control circuit 47. The detection timing control circuit 47 performs control to cause the detection circuit 48, the signal processing circuit 44, and the coordinate extraction circuit 45 to operate in synchronization with one another based on a control signal supplied from the detection control circuit 11.

The detection circuit 48 is, for example, an analog front-end (AFE) circuit. The detection circuit 48 is a signal processing circuit having functions of at least a detection signal amplifying circuit 42 and an analog-to-digital (A/D) conversion circuit 43. The detection signal amplifying circuit 42 amplifies the detection signals Vdet. The A/D conversion circuit 43 converts analog signals output from the detection signal amplifying circuit 42 into digital signals.

The signal processing circuit 44 is a logic circuit that detects a predetermined physical quantity received by the sensor 10 based on output signals of the detection circuit 48. The signal processing circuit 44 can detect asperities on the surface of the finger or the palm based on the signals from the detection circuit 48 when the finger is in contact with or in proximity to the detection surface SF (light guide plate LG). The signal processing circuit 44 can detect information on a living body based on the signals from the detection circuit 48. Examples of the information on the living body include a vascular image, the pulse waves, the pulsation, and a blood oxygen level of the finger or the palm.

The storage circuit 46 temporarily stores therein signals calculated by the signal processing circuit 44. The storage circuit 46 may be, for example, a random-access memory (RAM) or a register circuit.

The coordinate extraction circuit 45 is a logic circuit that obtains detected coordinates of the asperities on the surface of the finger or the like when the contact or proximity of the finger is detected by the signal processing circuit 44. The coordinate extraction circuit 45 is the logic circuit that also obtains detected coordinates of the blood vessels in the finger or the palm. The coordinate extraction circuit 45 combines the detection signals Vdet output from the photodiodes 30 of the sensor 10 to generate two-dimensional information indicating the shape of the asperities on the surface of the finger or the like and two-dimensional information indicating the shape of the blood vessels in the finger or the palm. The coordinate extraction circuit 45 may output the detection signals Vdet as sensor output voltages Vo instead of calculating the detected coordinates.

The following describes a circuit configuration example of the optical sensor 5. FIG. 5 is a circuit diagram of the detection element. As illustrated in FIG. 5, the detection element 3 includes the photodiode 30, a capacitive element Ca, and a first transistor Tr. The first transistor Tr is provided correspondingly to the photodiode 30. The first transistor Tr is formed of a thin-film transistor, and in this example, formed of an re-channel metal oxide semiconductor (MOS) thin-film transistor (TFT). The gate of the first transistor Tr is coupled to a corresponding one of the scan lines GLS. The source of the first transistor Tr is coupled to a corresponding one of the output signal lines SLS. The drain of the first transistor Tr is coupled to the anode of the photodiode 30 and the capacitive element Ca.

The cathode of the photodiode 30 is supplied with the power supply potential SVS from the power supply circuit 103. The capacitive element Ca is supplied with the reference potential VR1 serving as an initial potential of the capacitive element Ca from the power supply circuit 103.

Irradiating the detection element 3 conducts a current corresponding to the amount of the light through the photodiode 30, and thereby stores an electric charge in the capacitive element Ca. Turning on the first transistor Tr conducts a current corresponding to the electric charge stored in the capacitive element Ca through the output signal line SLS. The output signal line SLS is coupled to the detection circuit 48 through the signal line selection circuit 16. Thus, the detection device 1 can detect a signal corresponding to the amount of the light applied to the photodiode 30 for each of the detection elements 3.

Although FIG. 5 illustrates one of the detection elements 3, the scan line GLS and the output signal line SLS are coupled to a plurality of the detection elements 3. Specifically, the scan line GLS extends in the first direction Dx (refer to FIG. 3) and is coupled to the detection elements 3 arranged in the first direction Dx. The output signal line SLS extends in the second direction Dy and is coupled to a plurality of the detection elements 3 arranged in the second direction Dy.

The first transistor Tr is not limited to the n-type TFT and may be configured as a p-type TFT. The detection element 3 may be provided with a plurality of transistors corresponding to one photodiode 30.

Figure 6:
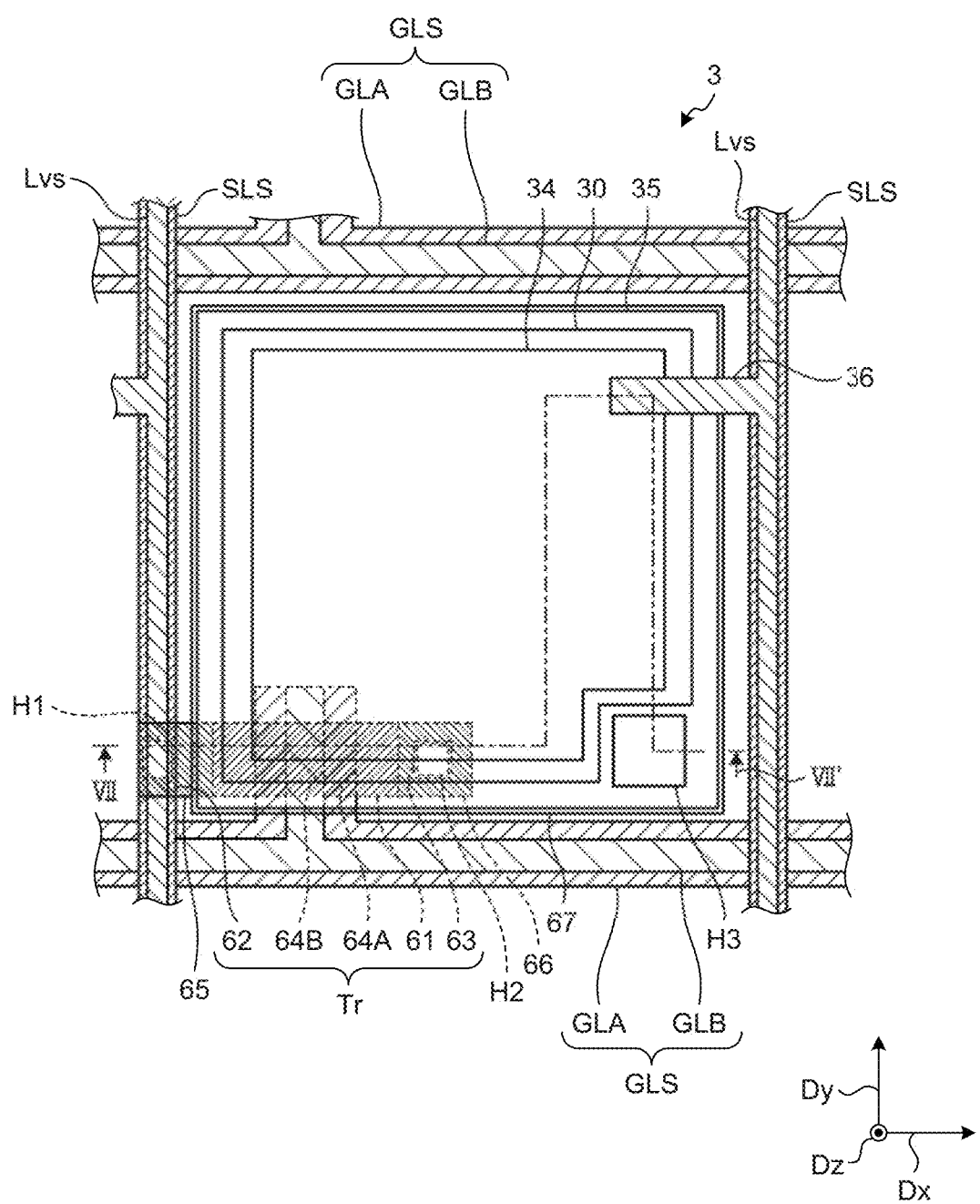
FIG. 6 is a plan view schematically illustrating the detection element according to the first embodiment.

The following describes a detailed circuit configuration of the detection device 1. FIG. 6 is a plan view schematically illustrating the detection element according to the first embodiment. As illustrated in FIG. 6, the detection element 3 is an area surrounded by the scan lines GLS and the output signal lines SLS. In the present embodiment, the scan line GLS includes a first scan line GLA and a second scan line GLB. The first scan line GLA is provided so as to overlap the second scan GLB. The first and the second scan lines GLA and GLB are provided in different layers with insulating layers 22c and 22d (refer to FIG. 7) interposed therebetween. The first and the second scan lines GLA and GLB are electrically coupled together at any point, and are supplied with the gate drive signals VGL having the same potential. The first scan lines GLA, the second scan lines GLB, or both are coupled to the scan line drive circuit 15. In FIG. 6, the first scan line GLA and the second scan line GLB have different widths, but may have the same width.

The photodiode 30 is provided in the area surrounded by the scan lines GLS and the output signal lines SLS. An upper electrode 34 and a lower electrode 35 are provided correspondingly to each of the photodiodes 30. The photodiode 30 is a PIN photodiode, for example. The lower electrode 35 is, for example, an anode electrode of the photodiode 30. The upper electrode 34 is, for example, a cathode electrode of the photodiode 30.

The upper electrode 34 is coupled to a power supply signal line Lvs through coupling wiring 36. The power supply signal line Lvs is wiring that supplies the power supply potential SVS to the photodiode 30. In the present embodiment, the power supply signal line Lvs extends in the second direction Dy while overlapping the output signal line SLS. The detection elements 3 arranged in the second direction Dy are coupled to the same power supply signal line Lvs. Such a configuration can enlarge an opening for the detection element 3. The lower electrode 35, the photodiode 30, and the upper electrode 34 are substantially quadrilateral in plan view. However, the shapes of the lower electrode 35, the photodiode 30, and the upper electrode 34 are not limited thereto, and can be modified as appropriate.

The first transistor Tr is provided near an intersection between the scan line GLS and the output signal line SLS. The first transistor Tr includes a semiconductor layer 61, a source electrode 62, a drain electrode 63, a first gate electrode 64A, and a second gate electrode 64B.

The semiconductor layer 61 is an oxide semiconductor. The semiconductor layer 61 is more preferably a transparent amorphous oxide semiconductor (TAOS) as one of the oxide semiconductors. Using an oxide semiconductor as the first transistor Tr can reduce a leakage current of the first transistor Tr. That is, the first transistor Tr can reduce the leakage current from the detection element 3 that is not selected. Therefore, the detection device 1 can improve the signal-to-noise ratio (S/N). The semiconductor layer 61 is, however, not limited thereto and may be formed of, for example, a microcrystalline oxide semiconductor, an amorphous oxide semiconductor, polysilicon, or low-temperature polycrystalline silicon (LTPS).

The semiconductor layer 61 is provided along the first direction Dx and intersects the first and the second gate electrodes 64A and 64B in plan view. The first and the second gate electrodes 64A and 64B are provided so as to branch from the first and the second sensor gate lines GLA and GLB, respectively. In other words, portions of the first and the second scan lines GLA and GLB that overlap the semiconductor layer 61 serve as the first and the second gate electrodes 64A and 64B. Aluminum (Al), copper (Cu), silver (Ag), molybdenum (Mo), or an alloy of these metals is used as the first and the second gate electrodes 64A and 64B. Channel regions are formed at portions of the semiconductor layer 61 that overlap the first and the second gate electrodes 64A and 64B.

One end of the semiconductor layer 61 is coupled to the source electrode 62 through a contact hole H1. The other end of the semiconductor layer 61 is coupled to the drain electrode 63 through a contact hole H2. A portion of the output signal line SLS that overlaps the semiconductor layer 61 serves as the source electrode 62. A portion of a third conductive layer 67 that overlaps the semiconductor layer 61 serves as the drain electrode 63. The third conductive layer 67 is coupled to the lower electrode 35 through a contact hole H3. Such a configuration allows the first transistor Tr to switch between coupling and decoupling between the photodiode 30 and the output signal line SLS.

The arrangement pitch of the detection elements 3 (photodiodes 30) in the first direction Dx is defined by the arrangement pitch of the output signal lines SLS in the first direction Dx. The arrangement pitch of the detection elements 3 (photodiodes 30) in the second direction Dy is defined by the arrangement pitch of the scan lines GLS in the second direction Dy.

Figure 7:
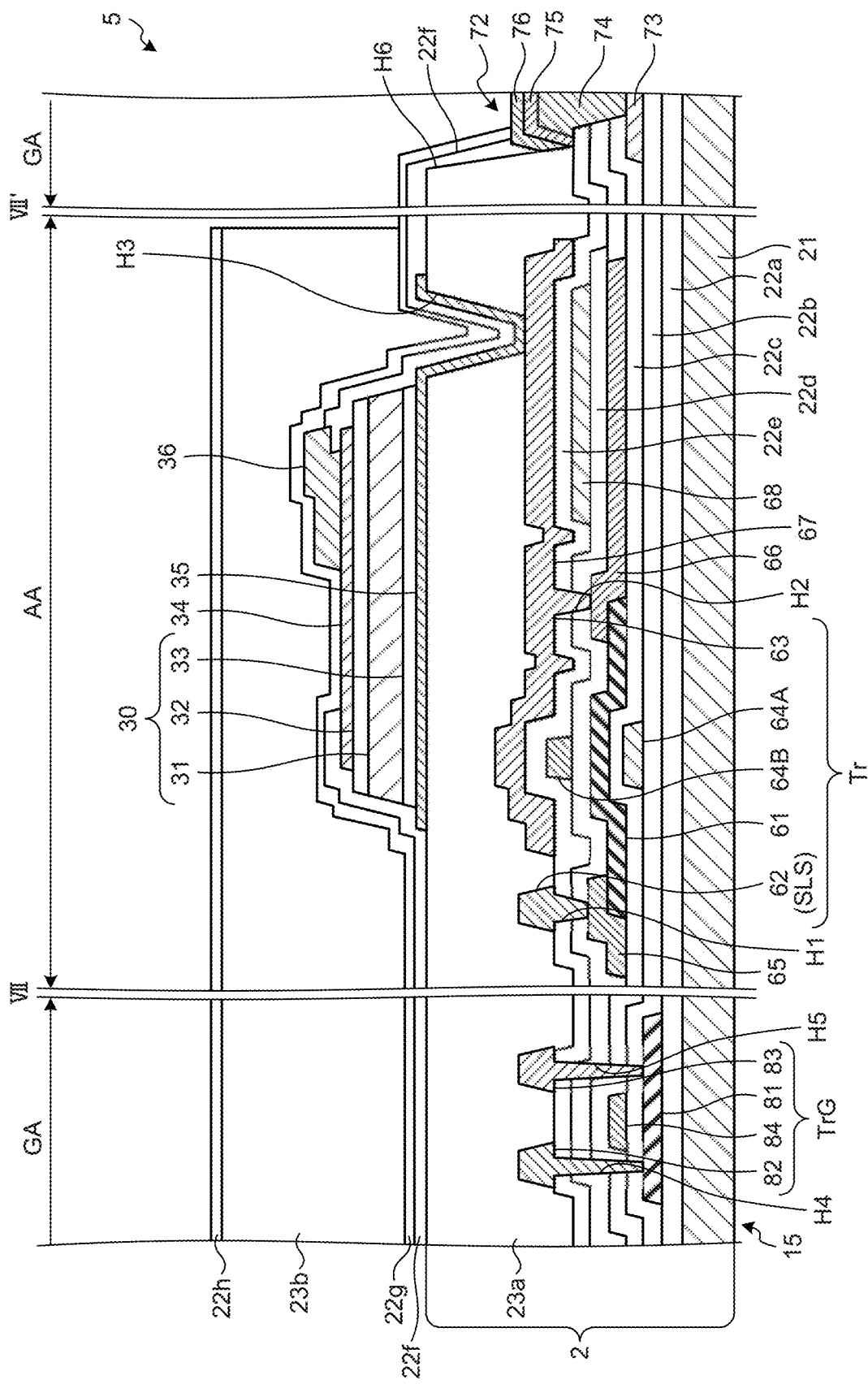
FIG. 7 is a sectional view along VII-VII' of FIG. 6.

The following describes a layer configuration of the optical sensor 5. FIG. 7 is a sectional view along VII-VII' of FIG. 6. In order to illustrate a relation between the layer structure of the detection area AA (refer to FIG. 3) and the layer structure of the peripheral area GA (refer to FIG. 3), FIG. 7 illustrates a section taken along a line VII-VII' and a section of a portion of the peripheral area GA that includes a second transistor TrG in a schematically connected manner. FIG. 7 further illustrates a section of a portion of the peripheral area GA that includes a terminal 72 in a schematically connected manner.

In the description of the optical sensor 5, a direction from the substrate 21 toward the photodiode 30 in a direction (third direction Dz) orthogonal to a surface of the substrate 21 is referred to as "upper side" or "above". A direction from the photodiode 30 toward the substrate 21 is referred to as "lower side" or "below".

As illustrated in FIG. 7, the substrate 21 is an insulating substrate and is made using, for example, a glass substrate of quartz, alkali-free glass, or the like. The first transistors Tr, various types of wiring (the scan lines GLS and the output signal lines SLS), and insulating layers are provided to form the array substrate 2 on a surface on one side of the substrate 21. The photodiodes 30 are arranged on the array substrate 2, that is, on the one surface side of the substrate 21. The substrate 21 may be a resin substrate or a resin film made of a resin such as polyimide.

Insulating layers 22a and 22b are provided on the substrate 21. Insulating layers 22a, 22b, 22c, 22d, 22e, 22f, and 22g are inorganic insulating films and are formed of a silicon oxide ($SiO_2$) or a silicon nitride (SiN). Each of the inorganic insulating layers is not limited to a single layer and may be a multilayered film.

The first gate electrode 64A is provided on the insulating layer 22b. The insulating layer 22c is provided on the insulating layer 22b so as to cover the first gate electrode 64A. The semiconductor layer 61, a first conductive layer 65, and a second conductive layer 66 are provided on the insulating layer 22c. The first conductive layer 65 is provided so as to cover an end of the semiconductor layer 61 coupled to the source electrode 62. The second conductive layer 66 is provided so as to cover an end of the semiconductor layer 61 coupled to the drain electrode 63.

The insulating layer 22d is provided on the upper side of the insulating layer 22c so as to cover the semiconductor layer 61, the first conductive layer 65, and the second conductive layer 66. The second gate electrode 64B is provided on the insulating layer 22d. The semiconductor layer 61 is provided between the first gate electrode 64A and the second gate electrode 64B in the direction orthogonal to the substrate 21. That is, the first transistor Tr has what is called a dual-gate structure. The first transistor Tr may, however, have a bottom-gate structure that is provided with the first gate electrode 64A and not provided with the second gate electrode 64B, or a top-gate structure that is not provided with the first gate electrode 64A and provided with only the second gate electrode 64B.

The insulating layer 22e is provided on the upper side of the insulating layer 22d so as to cover the second gate electrode 64B. The source electrode 62 (output signal line SLS) and the drain electrode 63 (third conductive layer 67) are provided on the insulating layer 22e. In the present embodiment, the drain electrode 63 is the third conductive layer 67 provided above the semiconductor layer 61 with the insulating layers 22d and 22e interposed therebetween. The source electrode 62 is electrically coupled to the semiconductor layer 61 through the contact hole H1 and the first conductive layer 65. The drain electrode 63 is electrically coupled to the semiconductor layer 61 through the contact hole H2 and the second conductive layer 66.

The third conductive layer 67 is provided in an area overlapping the photodiode 30 in plan view. The third conductive layer 67 is provided also on the upper side of the semiconductor layer 61 and the first and the second gate electrodes 64A and 64B. That is, the third conductive layer 67 is provided between the second gate electrode 64B and the lower electrode 35 in the direction orthogonal to the substrate 21. With this configuration, the third conductive layer 67 has a function as a protective layer that protects the first transistor Tr.

The second conductive layer 66 extends so as to face the third conductive layer 67 in an area not overlapping the semiconductor layer 61. A fourth conductive layer 68 is provided on the insulating layer 22d in the area not overlapping the semiconductor layer 61. The fourth conductive layer 68 is provided between the second conductive layer 66 and the third conductive layer 67. This configuration generates capacitance between the second conductive layer 66 and the fourth conductive layer 68, and capacitance between the third conductive layer 67 and the fourth conductive layer 68. The capacitance generated by the second conductive layer 66, the third conductive layer 67, and the fourth conductive layer 68 serves as capacitance of the capacitive element Ca illustrated in FIG. 5.

A first organic insulating layer 23a is provided on the insulating layer 22e so as to cover the source electrode 62 (output signal line SLS) and the drain electrode 63 (third conductive layer 67). The first organic insulating layer 23a is a planarizing layer that planarizes asperities formed by the first transistor Tr and various conductive layers.

The following describes a sectional configuration of the photodiode 30. In the photodiode 30, the lower electrode 35, the photodiode 30, and the upper electrode 34 are stacked in this order on the first organic insulating layer 23a of the array substrate 2.

The lower electrode 35 is provided on the first organic insulating layer 23a and is electrically coupled to the third conductive layer 67 through the contact hole H3. The lower electrode 35 is the anode of the photodiode 30 and is an electrode for reading the detection signal Vdet. For example, a metal material such as molybdenum (Mo) or aluminum (Al) is used as the lower electrode 35. The lower electrode 35 may alternatively be a multilayered film formed of a plurality of layers of these metal materials. The lower electrode 35 may be formed of a light-transmitting conductive material such as indium tin oxide (ITO) or indium zinc oxide (IZO).

The photodiode 30 includes an i-type semiconductor layer 31, an n-type semiconductor layer 32, and a p-type semiconductor layer 33 as semiconductor layers. The i-type semiconductor layer 31, the n-type semiconductor layer 32, and the p-type semiconductor layer 33 are formed of amorphous silicon (a-Si), for example. In FIG. 7, the p-type semiconductor layer 33, the i-type semiconductor layer 31, and the n-type semiconductor layer 32 are stacked in this order in the direction orthogonal to the surface of the substrate 21. However, the photodiode 30 may have a reversed configuration. That is, the n-type semiconductor layer 32, the i-type semiconductor layer 31, and the p-type semiconductor layer 33 may be stacked in this order. Each of the semiconductor layers may be a photoelectric conversion element formed of an organic semiconductor.

The a-Si of the n-type semiconductor layer 32 is doped with impurities to form an n+ region. The a-Si of the p-type semiconductor layer 33 is doped with impurities to form a p+ region. The i-type semiconductor layer 31 is, for example, a non-doped intrinsic semiconductor and has lower conductivity than that of the n-type semiconductor layer 32 and the p-type semiconductor layer 33.

The upper electrode 34 is the cathode of the photodiode 30, and is an electrode for supplying the power supply potential SVS to the photoelectric conversion layers. The upper electrode 34 is, for example, a light-transmitting conductive layer of, for example, ITO, and a plurality of the upper electrodes 34 are provided for the respective photodiodes 30.

The insulating layers 22f and 22g are provided on the first organic insulating layer 23a. The insulating layer 22f covers the periphery of the upper electrode 34 and is provided with an opening in a position overlapping the upper electrode 34. The coupling wiring 36 is coupled to the upper electrode 34 at a portion of the upper electrode 34 not provided with the insulating layer 22f. The insulating layer 22g is provided on the insulating layer 22f so as to cover the upper electrode 34 and the coupling wiring 36. A second organic insulating layer 23b serving as a planarizing layer is provided on the insulating layer 22g. If the photodiode 30 is made of organic semiconductors, an insulating layer 22h may be further provided on the photodiode 30.

The second transistor TrG of the scan line drive circuit 15 is provided in the peripheral area GA. The second transistor TrG is provided on the substrate 21 on which the first transistor Tr is provided. The second transistor TrG includes a semiconductor layer 81, a source electrode 82, a drain electrode 83, and a gate electrode 84.

The semiconductor layer 81 is polysilicon. The semiconductor layer 81 is more preferably low-temperature polysilicon (LTPS). The semiconductor layer 81 is provided on the insulating layer 22a. That is, the semiconductor layer 61 of the first transistor Tr is provided in a position farther from the substrate 21 than the semiconductor layer 81 of the second transistor TrG in the direction orthogonal to the substrate 21. However, the semiconductor layer 81 is not limited to this configuration, and may be formed in the same layer and of the same material as the semiconductor layer 61.

The gate electrode 84 is provided on the upper side of the semiconductor layer 81 with the insulating layer 22b interposed therebetween. The gate electrode 84 is provided in the same layer as the first gate electrode 64A. The second transistor TrG has what is called a top-gate structure. However, the second transistor TrG may have a dual-gate structure or a bottom-gate structure.

The source electrode 82 and the drain electrode 83 are provided on the insulating layer 22e. The source electrode 82 and the drain electrode 83 are provided in the same layer as the source electrode 62 and the drain electrode 63 of the first transistor Tr. Contact holes H4 and H5 are provided penetrating the insulating layers 22b to 22e. The source electrode 82 is electrically coupled to the semiconductor layer 81 through the contact hole H4. The drain electrode 83 is electrically coupled to the semiconductor layer 81 through the contact hole H5.

The terminal 72 is provided in a position of the peripheral area GA different from the area where the scan line drive circuit 15 is provided. The terminal 72 includes a first terminal conductive layer 73, a second terminal conductive layer 74, a third terminal conductive layer 75, and a fourth terminal conductive layer 76. The first terminal conductive layer 73 is provided in the same layer as the first gate electrode 64A on the insulating layer 22b. A contact hole H6 is provided so as to continue through the insulating layers 22c, 22d, 22e and the first organic insulating layer 23a.

The second terminal conductive layer 74, the third terminal conductive layer 75, and the fourth terminal conductive layer 76 are stacked in this order in the contact hole H6 and electrically coupled to the first terminal conductive layer 73. The second terminal conductive layer 74 can be formed using the same material and the same process as those of, for example, the third conductive layer 67. The third terminal conductive layer 75 can be formed using the same material and the same process as those of the lower electrode 35. The fourth terminal conductive layer 76 can be formed using the same material and the same process as those of the coupling wiring 36 and the power supply signal line Lvs (refer to FIG. 6).

While FIG. 7 illustrates one terminal 72, a plurality of the terminals 72 are arranged at intervals. The terminals 72 are electrically coupled to the wiring substrate 510 (refer to FIG. 3) by an anisotropic conductive film (ACF), for example.

The optical sensor 5 is not limited to the structure described above as long as the photodiode 30 can detect light. The optical sensor 5 may detect information other than the information on the fingerprint as long as the optical sensor 5 detects the information by receiving light using the photodiode 30.

Figure 8:
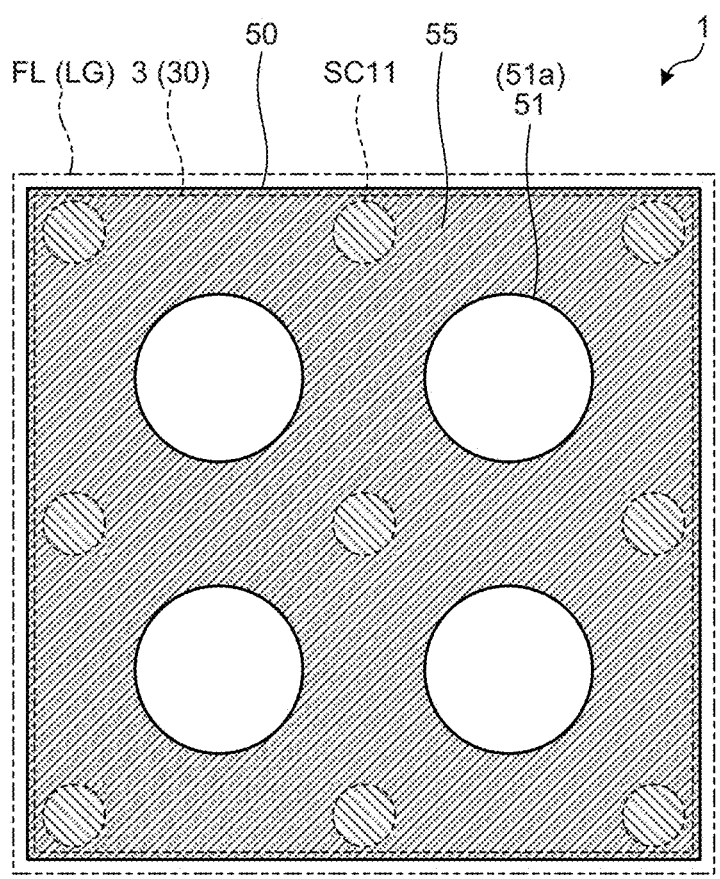
FIG. 8 is a plan view for describing an arrangement relation between a photodiode, an optical filter layer, and a plurality of scattering portions of a front light.

FIG. 8 is a plan view for describing an arrangement relation between the photodiode, the optical filter layer, and the scattering portions of the front light. FIG. 8 illustrates the light-blocking portion 55 of the optical filter layer with diagonal lines. The photodiode 30 is schematically illustrated with a dotted line. The outer shape of the photodiode 30 is, for example, the outer shape of the n-type semiconductor layer 32 (refer to FIG. 7) that forms the light-receiving portion of the photodiode 30. The scattering portions SC11 of the front light FL are illustrated with diagonal lines in a distinguished manner from the light-blocking portion 55.

As illustrated in FIG. 8, the light guide paths 51 of the optical filter layer 50 are arranged in the first direction Dx and the second direction Dy to be arranged in a matrix having a row-column configuration. The light guide paths 51 can each transmit light. As illustrated in FIGS. 8 and 2, the light guide paths 51 each have a first opening 51a on the front light FL side and a second opening 51b on the photodiode 30 side (not illustrated in FIG. 8). In the present embodiment, the light guide paths 51 extend in the third direction Dz, and the second openings 51b are arranged so as to overlap the first openings 51a in plan view. The second opening 51b has the same area as the first opening 51a.

The absorptance of the light by the light-blocking portion 55 is higher than by the light guide paths 51. In other words, the transmittance of the light through the light guide paths 51 is higher than the transmittance of the light through the light-blocking portion 55. The light-blocking portion 55 is provided around the light guide paths 51 and made of a member that is difficult to transmit light. The absorptance of the light by the light-blocking portion 55 is preferably from 99% to 100%, and more preferably 100%. The absorptance of the light herein refers to the ratio of the difference between the intensity of incoming light Lin and the intensity of outgoing light Lout to the intensity of the incoming light Lin ((Lin−Lout)/Lin).

The first and the second openings 51a and 51b of the light guide paths 51 are arranged so as to overlap the photodiodes 30. In FIG. 8, four of the light guide paths 51 are provided so as to overlap one photodiode 30. The arrangement is, however, not limited thereto. Only at least one of the light guide paths 51 needs to be provided so as to overlap one photodiode 30.

In plan view, the scattering portions SC11 are arranged in a matrix having a row-column configuration on the light guide plate LG of the front light FL. The diameter of the scattering portions SC11 is smaller than that of the light guide paths 51. As described above, the scattering portions SC11 of the front light FL are provided in the area overlapping the light-blocking portion 55 of the optical filter layer 50. In other words, the scattering portions SC11 of the front light FL are provided in an area not overlapping the light guide paths 51 of the optical filter layer 50.

The arrangement density of the scattering portions SC11 in an area overlapping the light guide paths 51 is smaller than the arrangement density of the scattering portions SC11 in the area overlapping the light-blocking portion 55. In more detail, in an area overlapping one photodiode 30, the number of the scattering portions SC11 overlapping the light guide paths 51 (0 in the example illustrated in FIG. 8) is smaller than the number of the scattering portions SC11 overlapping the light-blocking portion 55 (9 in the example illustrated in FIG. 8).

For ease of viewing, FIG. 8 schematically illustrates the number and diameter of the scattering portions SC11, but the number, diameter, arrangement pitch, and arrangement density of the scattering portions SC11 can be changed as appropriate. The scattering portions SC11 are not limited to overlapping none of the light guide paths 51 of the optical filter layer 50 and may be provided so as to overlap some of the light guide paths 51.

Figure 9:
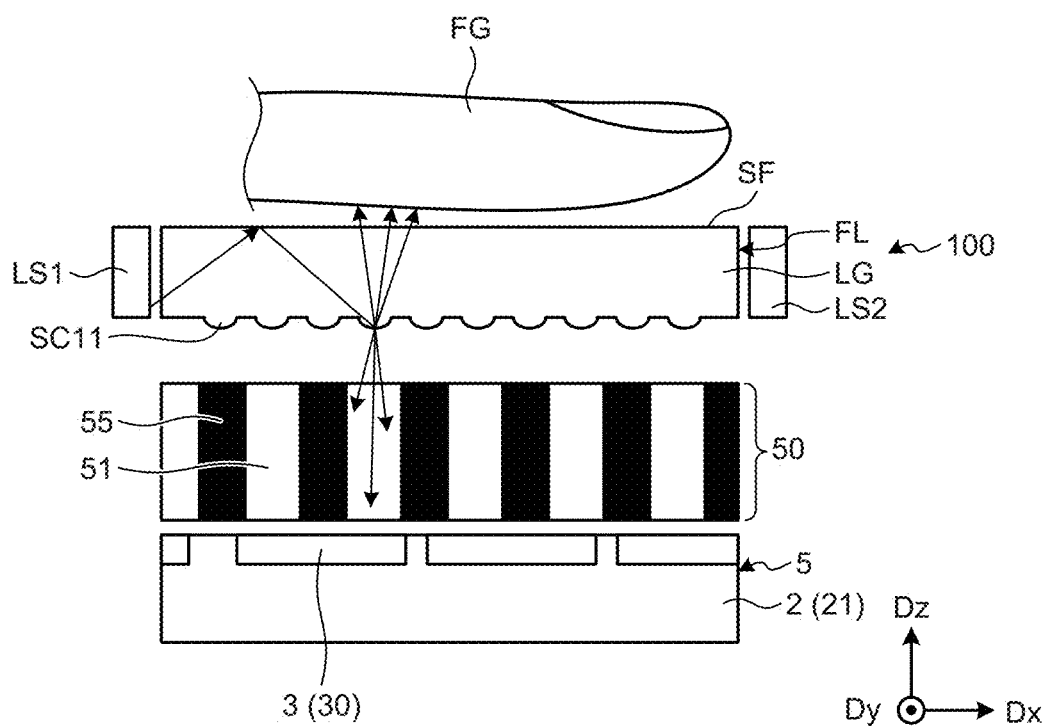
FIG. 9 is a sectional view schematically illustrating a section of a detection device according to a modification.

FIG. 9 is a sectional view schematically illustrating a section of a detection device according to a modification. In a detection device 100 of the modification, the scattering portions SC11 of the front light FL are provided in both the area overlapping the light guide paths 51 and the area overlapping the light-blocking portion 55. In the detection device 100 according to the modification, light scattered at the scattering portions SC11 overlapping the light guide paths 51 can more easily directly reach the photodiode 30.

In contrast, in the present embodiment, as illustrated in FIGS. 2 and 8, the scattering portions SC11 of the front light FL are provided in the area overlapping the light-blocking portion 55 of the optical filter layer 50, thus being provided so as not to overlap the light guide paths 51. An area of the light guide plate LG of the front light FL that overlaps the light guide paths 51 is formed as a flat surface where the scattering portions SC11 are not formed. This configuration causes the light scattered upward (toward the object to be detected FG) by the scattering portions SC11 to be reflected by the object to be detected FG such as the finger and enter the photodiode 30 through the light guide paths 51.

In contrast, the light scattered toward the optical filter layer 50 by the scattering portions SC11 does not enter the light guide paths 51 and is blocked by the light-blocking portion 55. The scattering portions SC11 are not provided in the area overlapping the light guide paths 51, or the number of the scattering portions SC11 overlapping the light guide paths 51 is smaller than that overlapping the light-blocking portion 55. Therefore, the light traveling in the light guide plate LG is totally reflected in the area overlapping the light guide paths 51, and light directly entering from the light guide plate LG of the front light FL into the light guide paths 51 can be reduced. That is, the detection device 1 can restrain external light other than the light reflected by the object to be detected FG from entering the photodiodes 30. As a result, the noise of the photodiodes 30 is reduced and the sensing sensitivity of the detection device 1 is improved.

The configuration of the optical filter layer 50 can be modified as appropriate. For example, the light guide paths 51 are not limited to extending in the third direction Dz, and may be provided so as to be tilted with respect to the third direction Dz. The second opening 51b and the first opening 51a are not limited to having the same area and may have different areas.

Figure 10:
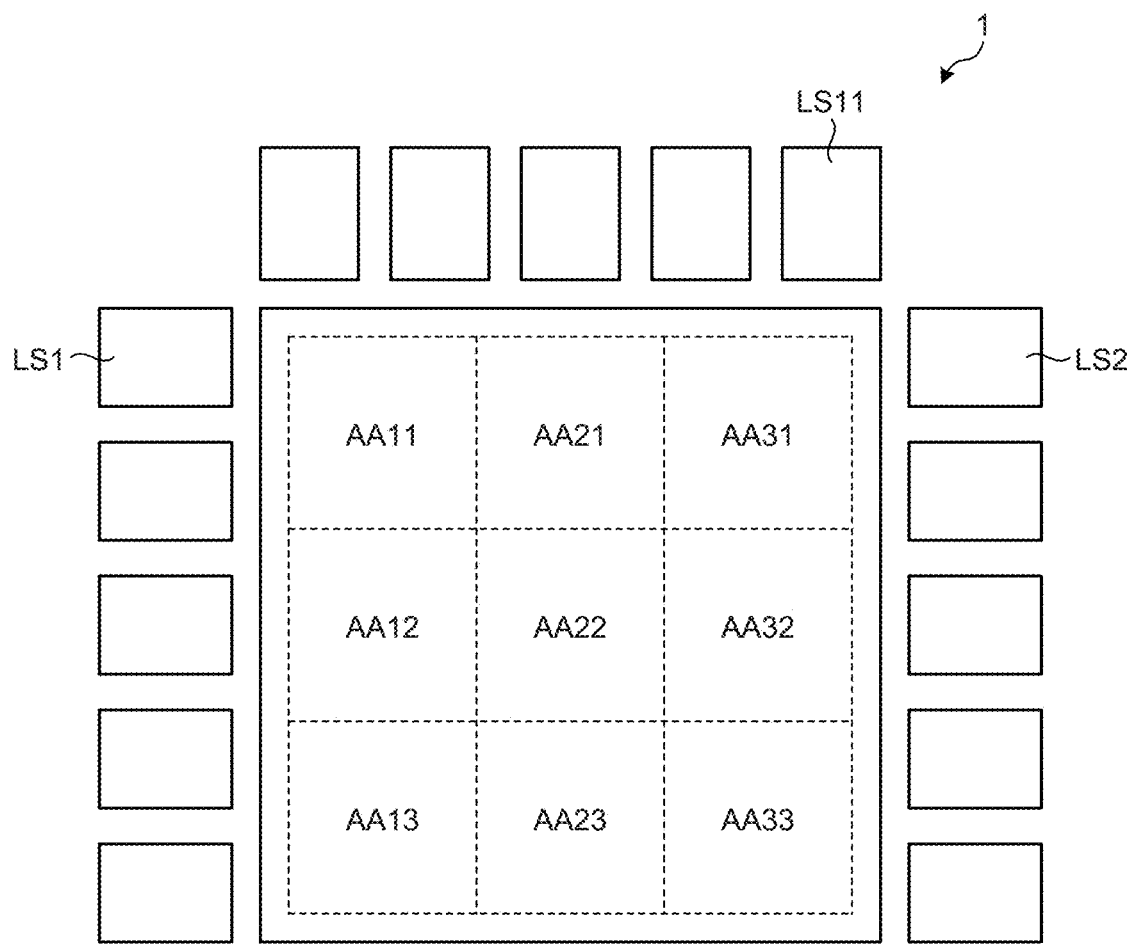
FIG. 10 is a plan view schematically illustrating a detection area of a light guide plate according to the first embodiment.
Figure 11:
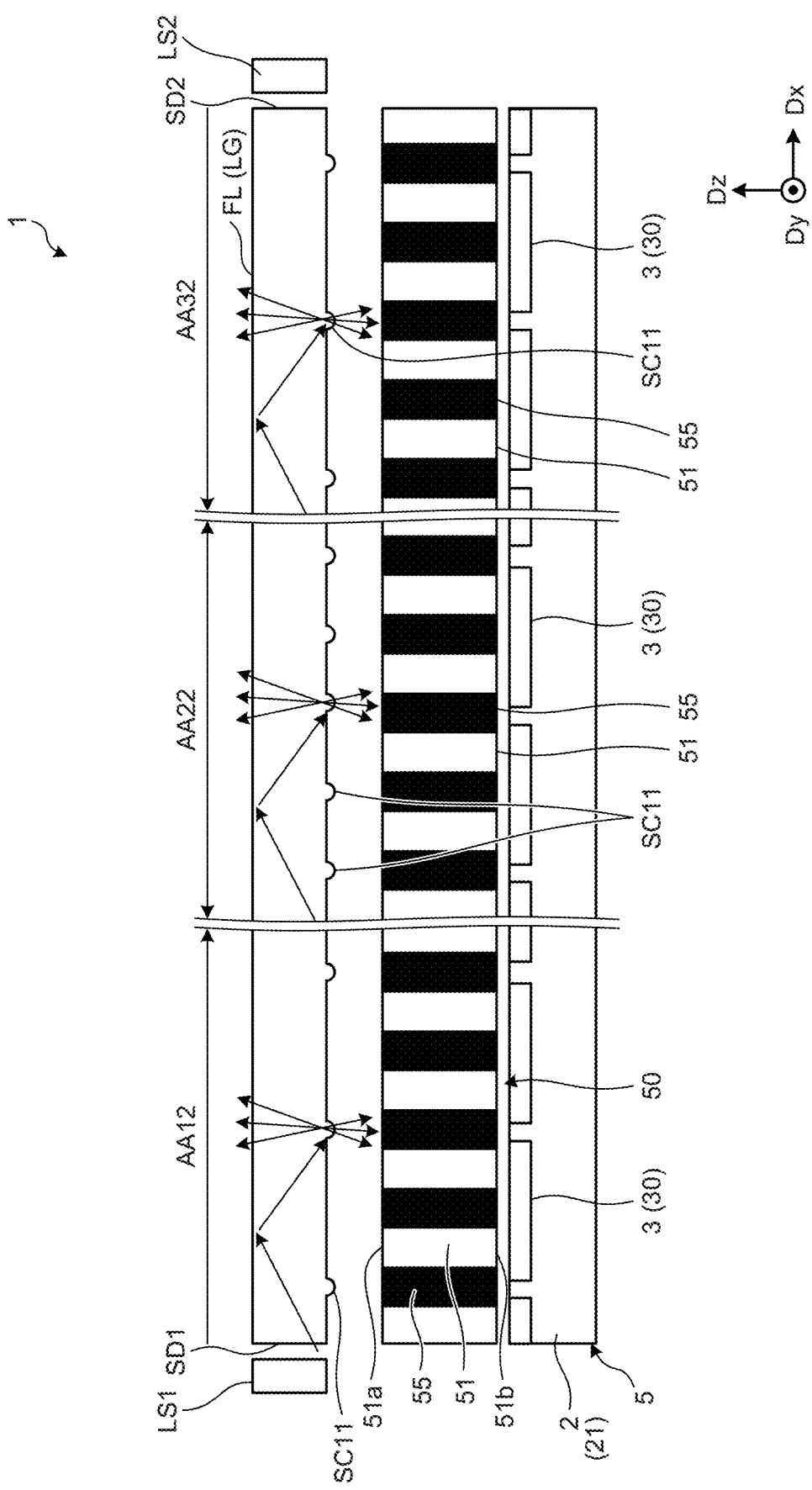
FIG. 11 is a sectional view illustrating an outline of a Dx-Dz section of FIG. 10.

FIG. 10 is a plan view schematically illustrating the detection area of the light guide plate according to the first embodiment. FIG. 11 is a sectional view illustrating an outline of a Dx-Dz section of FIG. 10. In FIG. 10, the detection area AA is divided into detection areas AA11, AA12, AA13, AA21, AA22, AA23, AA31, AA32, and AA33. The number of divisions of the detection area AA is not limited to this example.

As illustrated in FIG. 10, the light guide plate LG has, for example, the detection areas AA12, AA22, and AA32 arranged in the first direction Dx are positioned between the first side surface provided with the first light sources LS1 and the second side surface provided with the second light sources LS2. The detection area AA22 is provided between the detection area AA12 and the detection area AA32 and is an area farther from the first and the second light sources LS1 and LS2. The light guide plate LG has the detection areas AA11, AA21, and AA31 along the third side surface provided with the third light sources LS11.

As illustrated in FIG. 11, the first light sources LS1 are provided facing a first side surface SD1 of the light guide plate LG, and the second light sources LS2 are provided facing a second side surface SD2 opposite to the first side surface SD1 of the light guide plate LG.

Figure 12:
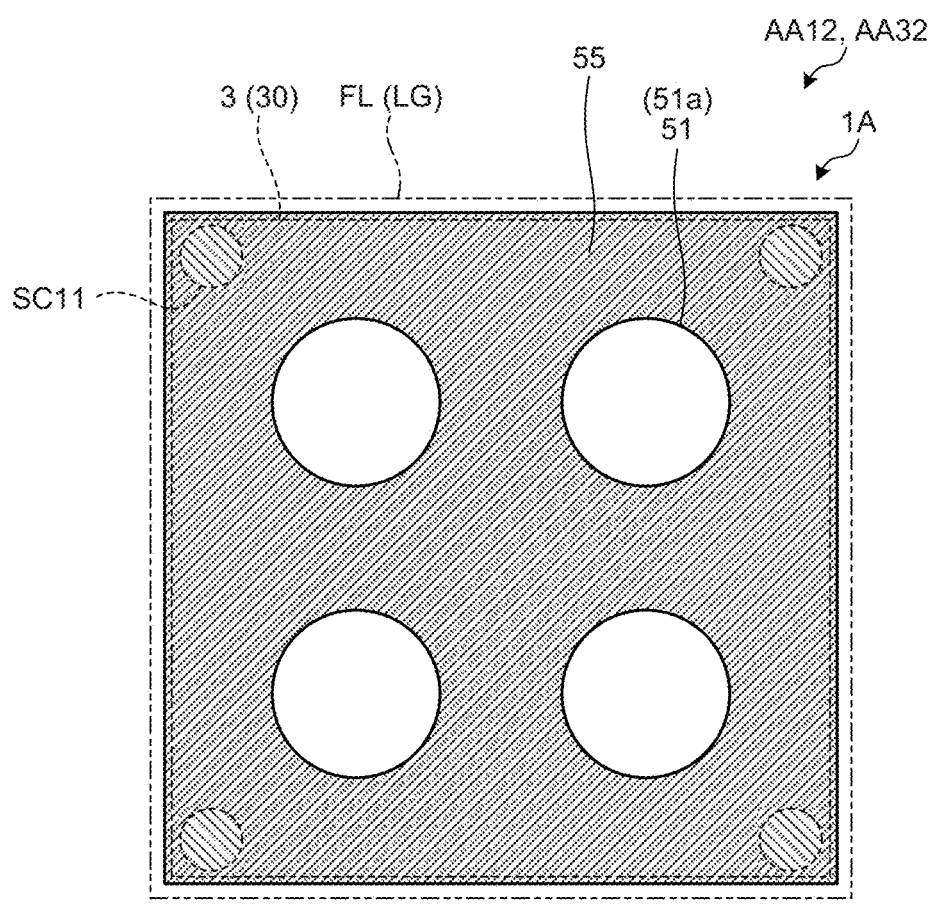
FIG. 12 is a plan view for describing the arrangement relation between the photodiode, the optical filter layer, and the scattering portions of the front light in a first detection area and a second detection area.
Figure 13:
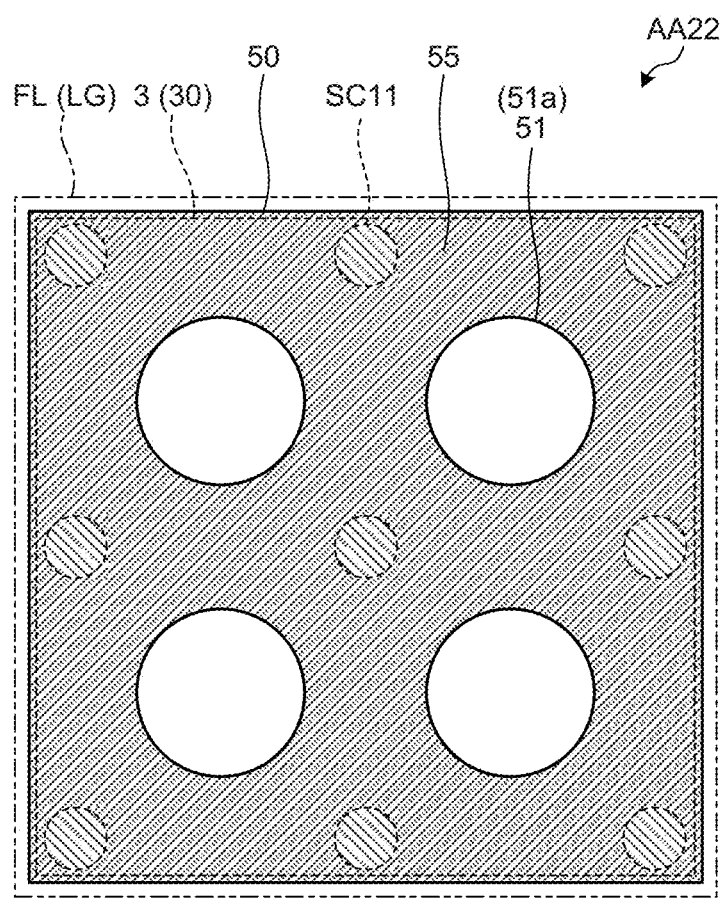
FIG. 13 is a plan view for describing the arrangement relation between the photodiode, the optical filter layer, and the scattering portions of the front light in a third detection area.

FIG. 12 is a plan view for describing the arrangement relation between the photodiode, the optical filter layer, and the scattering portions of the front light in a first detection area and a second detection area. FIG. 13 is a plan view for describing the arrangement relation between the photodiode, the optical filter layer, and the scattering portions of the front light in a third detection area.

As illustrated in FIGS. 10 to 12, the arrangement density of the scattering portions SC11 in the detection area AA22 farther from the first and the second light sources LS1 and LS2 is higher than the arrangement density of the scattering portions SC11 in the detection areas AA12 and AA32 closer to the first and the second light sources LS1 and LS2. That is, the number of the scattering portions SC11 overlapping one photodiode 30 in the detection area AA22 is larger than the number of the scattering portions SC11 overlapping one photodiode 30 in the detection area AA12. In the same manner, the number of the scattering portions SC11 overlapping one photodiode 30 in the detection area AA22 is larger than the number of the scattering portions SC11 overlapping one photodiode 30 in the detection area AA32. As a method for varying the arrangement density of the scattering portions SC11, an example has been described where a difference is made in the number of the scattering portions SC11 per unit area. However, a difference may be made in size of area of the scattering portions SC11 as the method for varying the arrangement density of the scattering portions SC11.

In the first embodiment, the number of the scattering portions SC11 overlapping one photodiode 30 in the detection area AA21 is the same as the number of the scattering portions SC11 overlapping one photodiode 30 in the detection area AA22. The number of the scattering portions SC11 overlapping one photodiode 30 in the detection area AA11 is the same as the number of the scattering portions SC11 overlapping one photodiode 30 in the detection area AA12. The number of the scattering portions SC11 overlapping one photodiode 30 in the detection area AA31 is the same as the number of the scattering portions SC11 overlapping one photodiode 30 in the detection area AA32. For this reason, no plan view is given for describing the arrangement relation between the photodiode, the optical filter layer, and the scattering portions of the front light in the detection areas AA11, AA21, and AA31. The number of the scattering portions SC11 overlapping one photodiode 30 in the detection area AA21 is larger than the number of the scattering portions SC11 overlapping one photodiode 30 in the detection area AA11. In the same manner, the number of the scattering portions SC11 overlapping one photodiode 30 in the detection area AA21 is larger than the number of the scattering portions SC11 overlapping one photodiode 30 in the detection area AA31.

Figure 14:
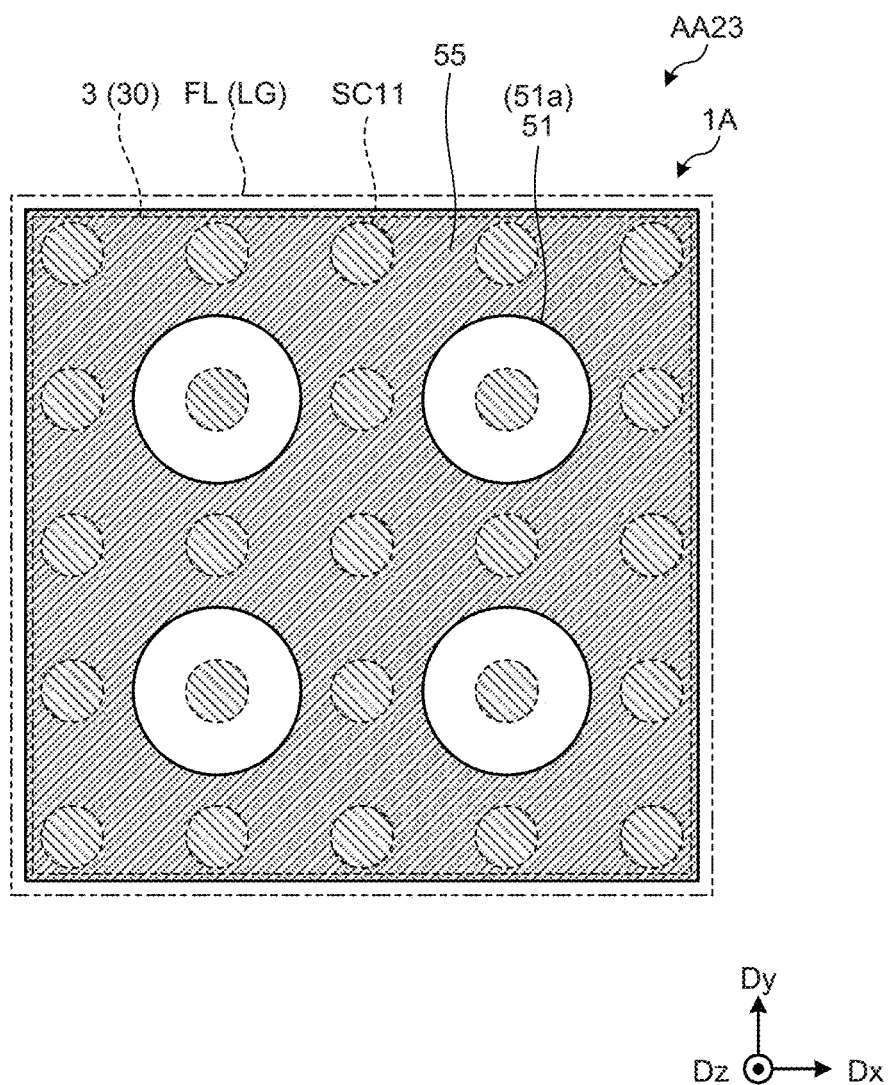
FIG. 14 is a plan view for describing the arrangement relation between the photodiode, the optical filter layer, and the scattering portions of the front light in a fifth detection area.

In the first embodiment, the number of the scattering portions SC11 overlapping one photodiode 30 in the detection area AA13 is the same as the number of the scattering portions SC11 overlapping one photodiode 30 in the detection area AA22. The number of the scattering portions SC11 overlapping one photodiode 30 in the detection area AA33 is the same as the number of the scattering portions SC11 overlapping one photodiode 30 in the detection area AA22. For this reason, no plan view is given for describing the arrangement relation between the photodiode, the optical filter layer, and the scattering portions of the front light in the detection areas AA13 and AA33. As illustrated in FIG. 14, the arrangement density of the scattering portions SC11 in the detection area AA23 farther from the first and the second light sources LS1 and LS2 is higher than the arrangement density of the scattering portions SC11 in the detection areas AA13 and AA33 closer to the first and the second light sources LS1 and LS2. The number of the scattering portions SC11 overlapping one photodiode 30 in the detection area AA23 is larger than the number of the scattering portions SC11 overlapping one photodiode 30 in the detection area AA13. In the same manner, the number of the scattering portions SC11 overlapping one photodiode 30 in the detection area AA23 is larger than the number of the scattering portions SC11 overlapping one photodiode 30 in the detection area AA33.

As a result, in the detection device 1 according to the first embodiment, compared with a configuration in which the scattering portions SC11 are provided at the same arrangement density in all the detection areas, more light is scattered by the scattering portions SC11 in the detection area AA22 farther from the first and the second light sources LS1 and LS2, and the red light can be extracted at a higher efficiency. This configuration can reduce a difference in intensity distribution of the light emitted toward the object to be detected FG such as the finger between the detection areas AA12, AA22, and AA32. Therefore, the detection device 1 can reduce detection variations that would be caused by differences in distance from the first and the second light sources LS1 and LS2.

In the first embodiment, the arrangement density of the scattering portions SC11 in the detection area AA23 farther from the third light sources LS11 is higher than the arrangement density of the scattering portions SC11 in the detection areas AA21 and AA22 closer to the third light sources LS11. The number of the scattering portions SC11 overlapping one photodiode 30 in the detection area AA23 is larger than the number of the scattering portions SC11 overlapping one photodiode 30 in the detection area AA21. In the same manner, the number of the scattering portions SC11 overlapping one photodiode 30 in the detection area AA23 is larger than the number of the scattering portions SC11 overlapping one photodiode 30 in the detection area AA22.

In the first embodiment, the arrangement density of the scattering portions SC11 in the detection area AA13 farther from the third light sources LS11 is higher than the arrangement density of the scattering portions SC11 in the detection areas AA11 and AA12 closer to the third light sources LS11. The number of the scattering portions SC11 overlapping one photodiode 30 in the detection area AA13 is larger than the number of the scattering portions SC11 overlapping one photodiode 30 in the detection area AA12. In the same manner, the number of the scattering portions SC11 overlapping one photodiode 30 in the detection area AA13 is larger than the number of the scattering portions SC11 overlapping one photodiode 30 in the detection area AA11.

In the first embodiment, the arrangement density of the scattering portions SC11 in the detection area AA33 farther from the third light sources LS11 is higher than the arrangement density of the scattering portions SC11 in the detection areas AA31 and AA32 closer to the third light sources LS11. The number of the scattering portions SC11 overlapping one photodiode 30 in the detection area AA33 is larger than the number of the scattering portions SC11 overlapping one photodiode 30 in the detection area AA32. In the same manner, the number of the scattering portions SC11 overlapping one photodiode 30 in the detection area AA33 is larger than the number of the scattering portions SC11 overlapping one photodiode 30 in the detection area AA31.

As described above, the detection device 1 according to the first embodiment includes the photodiodes 30 arranged on the array substrate 2, and the front light FL. The front light FL includes the light guide plate LG arranged so as to overlap the photodiodes 30, the first light sources LS1 that emit the red light to the first side surface of the light guide plate LG, the second light sources LS2 that emit the red light to the second side surface of the light guide plate LG, the third light sources LS11 that emit the infrared light having a wavelength different from that of the first light to the third side surface of the light guide plate LG, and the scattering portions SC11 that are provided on the light guide plate LG and scatter light from any of the first, the second, and the third light sources LS1, LS2, and LS11. The first, the second, and the third light sources LS1, LS2, and LS11 emit the light in a time-division manner.

Red blood cells contained in the blood contain hemoglobin. Hemoglobin is reddish-black in color when not bound to oxygen, and becomes bright red when bound to oxygen. Therefore, the coefficient of absorption of the red light differs between hemoglobin bound to oxygen ($HbO_2$) and hemoglobin not bound to oxygen (Hb). Hemoglobin not bound to oxygen (Hb) has a higher coefficient of absorption of the red light than hemoglobin bound to oxygen ($HbO_2$). Therefore, when the first and the second light sources LS1 and LS2 emit light and the red light passes through the blood, more red light is transmitted (reflected) as the hemoglobin bound to oxygen ($HbO_2$) increases. In contrast, less red light is transmitted (reflected) as the hemoglobin not bound to oxygen (Hb) increases. Thus, the amount of the hemoglobin bound to oxygen ($HbO_2$) can be relatively determined based on the amount of light (red light having a wavelength of 665 nm) received by the photodiodes 30.

In contrast, the coefficient of absorption of the infrared light (IR) does not differ much between the hemoglobin not bound to oxygen (Hb) and the hemoglobin bound to oxygen ($HbO_2$). That is, the infrared light (IR) decreases in proportion to the overall amount of hemoglobin through which the infrared light has passed. Therefore, the overall amount of hemoglobin can be determined based on the amount of light (infrared light having a wavelength of 880 nm) emitted by the third light sources LS11 and received by the photodiodes 30. Then, a muscle oxygen saturation level ($SmO_2$) is calculated by obtaining a ratio (R/IR) of the amount of the red light received to the amount of the infrared light (IR) received.

The detection device 1 of the first embodiment ensures the amount of light from the front light FL and uniformizes the illuminance of the red light (first and second light), and, in addition, can make a variety of measurements of the object to be detected FG by obtaining the detection results of the infrared light (third light) different from the first and the second light.

Second Embodiment

Figure 15:
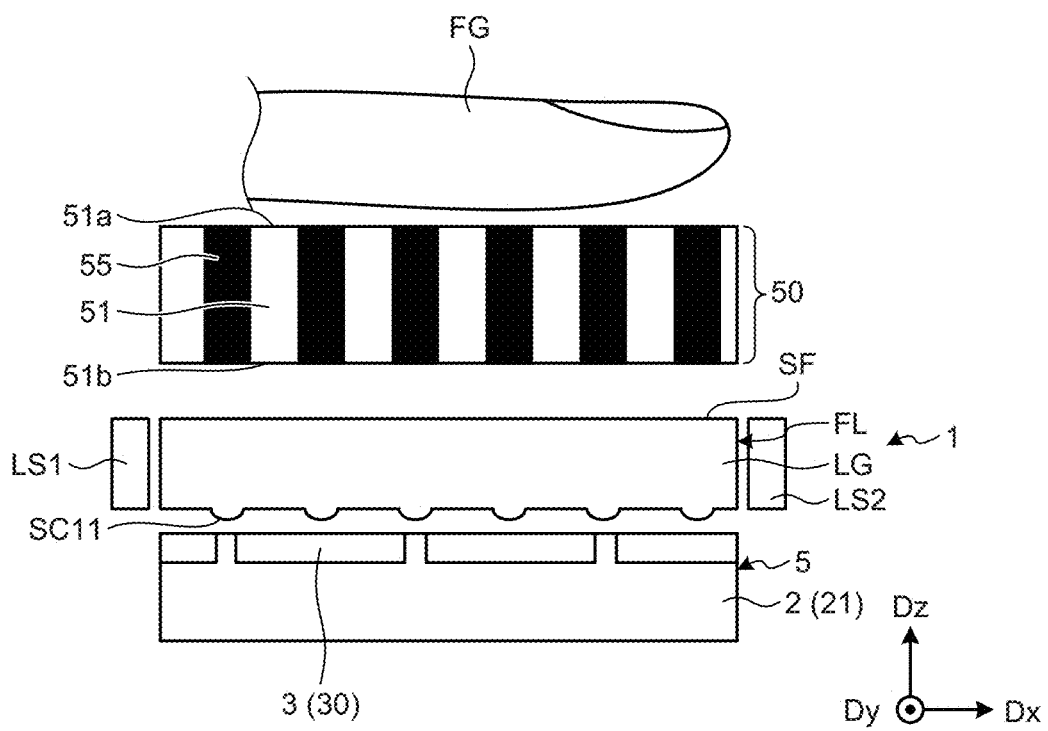
FIG. 15 is a sectional view illustrating a schematic sectional configuration of the detection device according to a second embodiment of the present disclosure.

FIG. 15 is a sectional view illustrating a schematic sectional configuration of the detection device according to a second embodiment of the present disclosure. In the following description, the same components as those described in the embodiment described above are denoted by the same reference numerals, and the description thereof will not be repeated.

In first embodiment described above, the example has been described where the optical filter layer 50 is located between the light guide plate LG and the photodiodes 30 of the optical sensor 5, but the structure is not limited to this example. In the second embodiment, the light guide plate LG is located between the optical filter layer 50 and the photodiodes 30 of the optical sensor 5.

In each of the embodiments described above, the optical filter layer 50 has been illustrated as a light guide column structure in which the light guide paths are formed in column shapes, but the structure is not limited thereto and various configurations can be applied. For example, the optical filter layer 50 may have a multilayered pinhole structure in which a plurality of light-blocking layers provided with a plurality of pinholes and light-transmitting resin layers are alternately stacked. Alternatively, the optical filter layer 50 may have a configuration in which a plurality of light-transmitting optical fibers are solidified together by a colored resin layer (light-blocking portion 55). Alternatively, the optical filter layer 50 may have a configuration in which light-blocking layers and light-transmitting layers stacked in a louver shape are arranged so as to be orthogonal to each other. Alternatively, the optical filter layer 50 may be provided with microlenses as required.

The configuration has been described in which the scattering portions SC11 of the front light FL are formed of the dot-shaped projecting portions, but the scattering portions SC11 are not limited to this configuration. The scattering portions SC11 may be prism-shaped portions (triangular projecting or recessed portions).

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiments and the modification described above.

What is claimed is:

1. A detection device comprising:
photodiodes arranged on a substrate; and
a front light comprising
a light guide plate disposed so as to overlap the photodiodes,
a first light source configured to emit first light to a first side surface of the light guide plate,
a second light source configured to emit second light having the same wavelength as that of the first light to a second side surface of the light guide plate opposite to the first side surface,
a third light source configured to emit third light having a wavelength different from that of the first light to a third side surface of the light guide plate different from the first side surface and the second side surface, and
scattering portions that are provided on the light guide plate and configured to scatter light from any of the first light source, the second light source, and the third light source; and
an optical filter layer including
light guide paths that at least partially overlap the photodiodes, and
a light-blocking portion having higher absorptance of the light than the light guide paths,
wherein the scattering portions overlap the light-blocking portion of the optical filter layer, the scattering portions being provided on a surface of the light guide plate facing the optical filter layer, and
the light guide plate has a plurality of detection areas each overlapping one of the photodiodes, the detection areas including:
a first detection area closer to the first light source facing the first side surface;
a second detection area closer to the second light source facing the second side surface; and
a third detection area located between the first detection area and the second detection area,
in the third detection area, the scattering portions include one center scattering portion disposed in a center of the third detection area located in between four of the light guide paths adjacent to the center scattering portion; and
in the first detection area and the second detection area, the scattering portions are arranged outside a center of light guide path groups each including four of the light guide paths.

2. The detection device according to claim 1, wherein the optical filter layer is located between the light guide plate and the photodiodes.

3. The detection device according to claim 1, wherein
first scattering portions overlapping one of the photodiodes in the third detection area are larger in number than second scattering portions overlapping one of the photodiodes in the first detection area and third scattering portions overlapping one of the photodiodes in the second detection area.

4. The detection device according to claim 3, wherein
the light guide plate has a fourth detection area closer to the third light source facing the third side surface and a fifth detection area farther from the third light source than the fourth detection area, and
fourth scattering portions overlapping one of the photodiodes in the fifth detection area are larger in number than sixth scattering portions overlapping one of the photodiodes in the fourth detection area.

* * * * *